(12) United States Patent
Venkataramana et al.

(10) Patent No.: US 10,847,044 B2
(45) Date of Patent: Nov. 24, 2020

(54) SYSTEMS AND METHODS FOR PRESENTING GRAPHICAL DISPLAY ELEMENTS FOR VARIABLE OR ADAPTIVE AIRCRAFT GLIDESLOPE AND SAFE AREAS FOR AIRCRAFT OPERATIONS

(71) Applicant: HONEYWELL INTERNATIONAL INC., Morris Plains, NJ (US)

(72) Inventors: Kiran Mancheiah Venkataramana, Karnataka (IN); Mohan Gowda Chandrashekarappa, Karnataka (IN); Purushothama C, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 264 days.

(21) Appl. No.: 15/907,620

(22) Filed: Feb. 28, 2018

(65) Prior Publication Data
US 2019/0266903 A1    Aug. 29, 2019

(51) Int. Cl.
G08G 5/02      (2006.01)
G01C 23/00    (2006.01)
G08G 5/00      (2006.01)

(52) U.S. Cl.
CPC ............ *G08G 5/025* (2013.01); *G01C 23/00* (2013.01); *G01C 23/005* (2013.01); *G08G 5/0021* (2013.01)

(58) Field of Classification Search
CPC ..... G08G 5/025; G08G 5/0021; G01C 23/005
See application file for complete search history.

(56) References Cited

U.S. PATENT DOCUMENTS

| | | | |
|---|---|---|---|
| 4,825,374 A | 4/1989 | King et al. | |
| 8,655,506 B2 | 2/2014 | Gomez et al. | |
| 9,153,139 B2 | 10/2015 | De Tarso Ferreira et al. | |
| 9,646,506 B2 * | 5/2017 | Ishihara | G05D 1/0676 |
| 2002/0116097 A1 * | 8/2002 | Block | G01C 23/00 701/9 |
| 2006/0273928 A1 * | 12/2006 | Van Boven | G05D 1/0676 340/945 |
| 2015/0298821 A1 | 10/2015 | Ishihara et al. | |
| 2016/0378121 A1 * | 12/2016 | Shue | G05D 1/105 701/7 |
| 2017/0092140 A1 | 3/2017 | Ishihara et al. | |
| 2017/0124886 A1 | 5/2017 | Ishihara et al. | |
| 2017/0243495 A1 | 8/2017 | Moravek et al. | |

OTHER PUBLICATIONS

Enhanced Ground Proximity Warning System (EGPWS) Pilot's Guide; May 2004.
Barrows, A.K., et al; Flying a Tunnel-In-The-Sky Display Within the Current Airspace System; American Institute of Aeronautics and Astronautics, 1999.

* cited by examiner

*Primary Examiner* — Rachid Bendidi
(74) *Attorney, Agent, or Firm* — Lorenz & Kopf, LLP

(57) ABSTRACT

A method for providing aircraft descent data and approach data onboard an aircraft is provided. The method determines a safe descent area bounded by an outer boundary region, by a processor communicatively coupled to a system memory element, based on an optimum glideslope angle, variable glideslope data, and a continuously monitored boundary exceedance condition; and presents graphical elements associated with the safe descent area, the optimum glideslope angle, and the outer boundary region, by a display device communicatively coupled to the processor.

14 Claims, 7 Drawing Sheets

SYSTEMS AND METHODS FOR PRESENTING GRAPHICAL DISPLAY ELEMENTS FOR VARIABLE OR ADAPTIVE AIRCRAFT GLIDESLOPE AND SAFE AREAS FOR AIRCRAFT OPERATIONS

TECHNICAL FIELD

Embodiments of the subject matter described herein relate generally to the presentation of aircraft descent data onboard an aircraft. More particularly, embodiments of the subject matter relate to the computation and presentation of a variable glideslope data during approach.

BACKGROUND

The demand for air transportation increases, year over year, and air traffic located in a given region of airspace is becoming denser. Thus, the efficient use of airspace and safely increasing the number of aircraft in operation, in a particular location and at a particular time, is of critical importance. Current strategies for increasing the efficient usage of airspace include parallel approach operations and reduced airborne separation between airplanes. However, typical approach trajectories are close to the ground for long periods of time, creating increased levels of noise for the residents in the proximity of the landing path. Moreover, maintaining a typical approach trajectory to a runway with an approach speed suited for the aircraft imposes an increase in the generation of thrust and noise, overconsumption of fuel, and increased emissions.

Accordingly, it is desirable to pursue landing techniques geared towards lowering emissions, decreasing a quantity of fuel consumption during landing, and decreasing the noise created during landing. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing aircraft descent data and approach data onboard an aircraft. The method determines a safe descent area bounded by an outer boundary region, by a processor communicatively coupled to a system memory element, based on an optimum glideslope angle, variable glideslope data, and a continuously monitored boundary exceedance condition; and presents graphical elements associated with the safe descent area, the optimum glideslope angle, and the outer boundary region, by a display device communicatively coupled to the processor.

Some embodiments of the present disclosure provide a system for providing aircraft descent data and approach data onboard an aircraft. The system includes a system memory element; a communication device configured to establish communication connections to a flight management system (FMS) and avionics systems onboard the aircraft; a display device, configured to present descent path data onboard the aircraft; and at least one processor communicatively coupled to the system memory element, the communication device, and the display device, the at least one processor configured to: determine a safe descent area bounded by an outer boundary region, based on an optimum glideslope angle, variable glideslope data, and a continuously monitored boundary exceedance condition; and present graphical elements associated with the safe descent area, the optimum glideslope angle, and the outer boundary region, via the display device.

Some embodiments of the present disclosure provide a non-transitory, computer-readable medium containing instructions thereon, which, when executed by a processor, perform a method for providing aircraft descent data and approach data onboard an aircraft. The method obtains user input selection data from a flight management system (FMS) onboard the aircraft, by the processor via a communication device configured to establish communication connections between the processor and the FMS, wherein the user input selection data includes an instruction to disengage managed vertical guidance and to engage approach mode; initiates computation of a safe descent area, when the approach mode is engaged; determines the safe descent area bounded by an outer boundary region, by the processor, based on an optimum glideslope angle, variable glideslope data, and a continuously monitored boundary exceedance condition; and presents graphical elements associated with the safe descent area, the optimum glideslope angle, and the outer boundary region, by a display device communicatively coupled to the processor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for determining a safe region for descent guidance of an aircraft such that aircraft can use a variable glideslope (instead of constant glideslope) during approach and landing of the aircraft. More specifically, the subject matter relates to using an increased glideslope, or in other words, to generate an optimized, "steep" glideslope that is greater than the constant three degrees (3°) glideslope angle that is typically used. Currently, a typical approach path terminates at constant slope, at the time of landing, to be compatible with the landing means which are materially defined with a constant slope setting. These trajectories are compatible with all aircrafts. The constant slope used as the glideslope is typically a low slope in the order of three degrees (3°), imposed by the customary landing procedures. Such a low slope induces an approach trajectory that is close to the ground for a lengthy period of time, resulting in excessive noise, overconsumption of fuel, and increased emissions. Also contemplated herein is the presentation of graphical elements, via a Vertical Situation Display (VSD), to provide situational awareness for a flight crew using the variable glideslope functionality during approach and landing. Such graphical elements include a clearly presented safe region that is visually distinguishable, via the VSD, from an unsafe region for descent of the aircraft.

Figure 1:
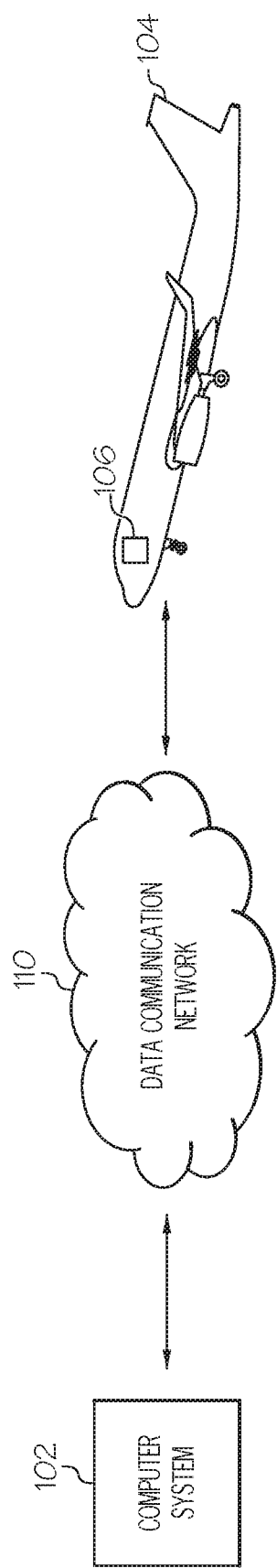
FIG. 1 is a diagram of a variable glideslope system, in accordance with the disclosed embodiments.

Turning now to the figures, FIG. 1 is a diagram of a variable glideslope system 100, in accordance with the disclosed embodiments. The variable glideslope system 100 operates to compute and present dynamic, real-time, descent guidance (including glideslope data) for an aircraft 104 during approach. The variable glideslope system 100 may include, without limitation, a computing device 102 that communicates with one or more avionics systems 106 onboard the aircraft 104, via a data communication network 110. In practice, certain embodiments of the variable glideslope system 100 may include additional or alternative elements and components, as desired for the particular application.

The computing device 102 may be implemented by any computing device that includes at least one processor, some form of memory hardware, a user interface, and communication hardware configured to establish communication connection to at least a navigation database that includes the source flight plan. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present graphical elements representative of descent guidance and variable glideslope data. In other embodiments, the computing device 102 may be implemented using a computer system onboard the aircraft 104, which is configured to determine and present descent guidance that includes variable glideslope data.

The aircraft 104 may be any aviation vehicle for which descent guidance and variable, adaptive glideslope data are relevant and applicable during the descent and approach phases of a flight. The aircraft 104 may be implemented as an airplane, helicopter, spacecraft, hovercraft, or the like. The one or more avionics systems 106 may include a Flight Management System (FMS), navigation devices, and other sensors and systems onboard the aircraft 104. Data obtained from the one or more avionics systems 106 may include, without limitation: flight data, weather data, aircraft speed, aircraft altitude, aircraft landing weight, wind data, temperature data, runway pressure altitude, or the like. The computing device 102 is usually located onboard the aircraft 104, and the computing device 102 communicates with the one or more avionics systems 106 via wired and/or wireless communication connection.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the computing device 102 obtains relevant aircraft parameters and data associated with approach, descent, and in particular, variable glideslope data, from the one or more avionics systems 106 and, in certain embodiments, remotely located data storage (e.g., external memory hardware, one or more servers). The computing device 102 then uses the relevant aircraft parameters and data to compute appropriate variable glideslope data for a current approach and descent of the aircraft 104, and presents graphical elements representative of the computed variable glideslope data and descent guidance such that a user (e.g., a flight crew member) may make approach, descent, and glideslope use decisions based on the presented graphical elements. The computing device 102 is further configured to continuously and dynamically compute and present updated approach data, descent data, and variable glideslope data during flight. Such dynamic, real-time computation of variable glideslope data considers updated, real-time data which may alter previously-calculated variable glideslope data and descent guidance.

Figure 2:
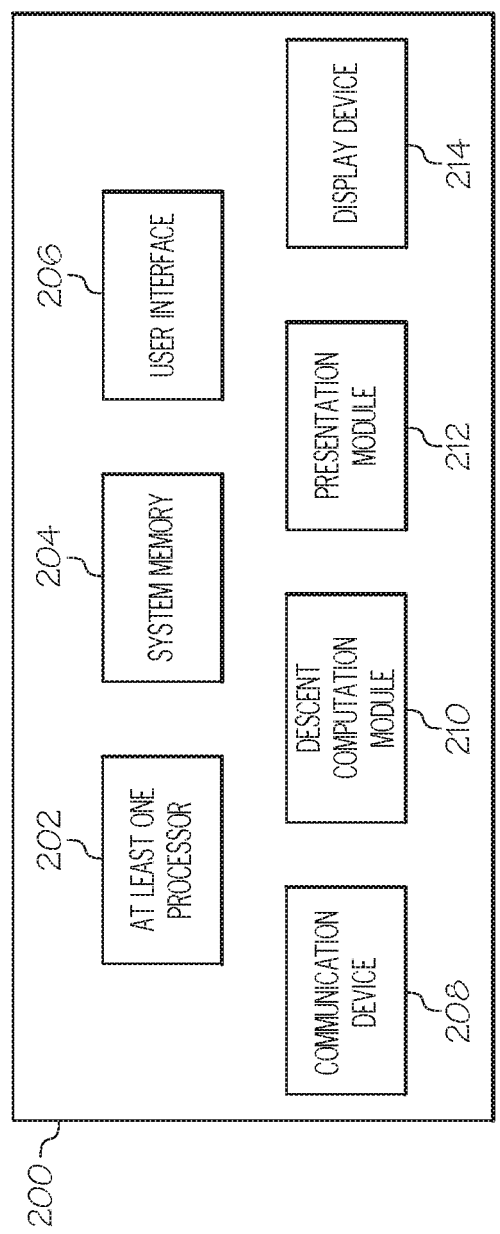
FIG. 2 is a functional block diagram of a computing device for use as part of a variable glideslope system, in accordance with the disclosed embodiments.

FIG. 2 is a functional block diagram of a computing device for use as part of a variable glideslope system, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a user interface 206; a communication device 208; a descent computation module 210; a presentation module 212; and a display device 214. These elements and features of the computing device 200 may be operatively associated with one another, coupled to one another, or otherwise configured to cooperate with one another as needed to support the desired functionality—in particular, dynamically providing approach data, descent data, and associated variable glideslope data, onboard an aircraft during flight, as described herein. For ease of illustration and clarity, the various physical, electrical, and logical couplings and interconnections for these elements and features are not depicted in FIG. 1. Moreover, it should be appreciated that embodiments of the computing device 200 will include other elements, modules, and features that cooperate to support the desired functionality. For simplicity, FIG. 2 only depicts certain elements that relate to the variable glideslope data generating and presenting techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with approach data, descent data, variable or adaptive glideslope data, auditory and/or visual notification or warning systems, and graphical elements associated with the variable and adaptive glideslope data system. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide user input selections to change a current mode selection for a communicatively-coupled Flight Management System (FMS). For example, the user interface 206 may be manipulated to disengage managed vertical guidance and to engage approach mode, which initiates operation of the variable and adaptive glideslope system (as described herein).

In certain embodiments, the user interface 206 may include or cooperate with various features to allow a user to interact with the computing device 200 via graphical elements rendered on a display element (e.g., the display device 214). Accordingly, the user interface 206 may initiate the creation, maintenance, and presentation of a graphical user interface (GUI). In certain embodiments, the display device 214 implements touch-sensitive technology for purposes of interacting with the GUI. Thus, a user can manipulate the GUI by moving a cursor symbol rendered on the display device 214, or by physically interacting with the display device 214 itself for recognition and interpretation, via the user interface 206.

The communication device 208 is suitably configured to communicate data between the computing device 200 and one or more remote servers and one or more avionics systems onboard an aircraft. The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: aircraft parameter data (e.g., aircraft speed, vertical speed, altitude, aircraft landing weight), wind data, temperature data, runway pressure altitude, and other data compatible with the computing device 200. Data provided by the communication device 208 may include, without limitation, requests for aircraft parameter data (e.g., aircraft speed, vertical speed, altitude), user selections to disable a vertical managed mode of the FMS or to engage an approach mode of the FMS, and the like.

The descent computation module 210 is suitably configured to compute approach and descent data for an aircraft, including a safe region for descent; an optimum glideslope angle; a predictive descent path trajectory that includes an outer boundary region based on a maximum descent angle; and a maximum displaced landing threshold for the aircraft. Exemplary embodiments of the computed parameters are illustrated in FIGS. 3-6. The safe region for aircraft descent permits use of an adaptive, increased glideslope. The safe region is bounded by an approach profile based on a standard glideslope and a maximum descent angle (i.e., the outer boundary). The optimum glideslope angle is computed as a function of aircraft landing weight, wind data, temperature data, and runway pressure altitude. The optimum glideslope angle is a "steep" descent path, or in other words, the optimum glideslope angle is a calculated glideslope that is greater than the constant value of three degrees (3°) typically used during descent and landing. The optimum glideslope angle is associated with decreased emissions, decreased fuel burn, and a displaced touchdown point. The predictive descent path trajectory of the aircraft is based on aircraft ground speed, vertical speed, category of aircraft, and altitude. The predictive descent path trajectory is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path). The maximum displaced landing threshold is such that the remaining runway length following the threshold point is sufficient for performing safe stopping of the aircraft based on the aircraft weight and environmental factors, including wind data, temperature data, humidity data, snow data, and the like.

The presentation module 212 is configured to present graphical elements and text (via the display device 214) representative of approach and descent data, and associated variable glideslope data. Exemplary embodiments of the graphical elements may include, without limitation: a visual representation of a final approach segment, a touchdown point, a threshold runway distance available for landing, an extrapolated aircraft descent profile, an approach profile based on a standard glideslope, and an outer boundary region representative of a maximum descent angle. The presentation module 212 is further configured to present a safe descent path area for approach and landing, wherein the safe descent path area is an area disposed between (1) the approach profile based on the standard glideslope and (2) the outer boundary region (e.g., the maximum descent angle). The presentation module 212 also presents potentially unstable and unsafe descent regions using characteristics that are visually distinguishable from the visual characteristics of the safe descent area. For example, the presentation module 212 may display the safe descent area using a first color and the unsafe/unstable descent regions using a second color, wherein the first color and the second color are visually distinguishable. Additionally, some embodiments of the presentation module 212 are also configured to present alerts, warnings, and/or messages using graphical elements and text, and/or using other types of visual and/or auditory alerts.

In practice, the descent computation module 210 and/or the presentation module 212 may be implemented with (or cooperate with) the at least one processor 202 to perform at least some of the functions and operations described in more detail herein. In this regard, the descent computation module 210 and/or the presentation module 212 may be realized as suitably written processing logic, application program code, or the like.

The display device 214 is configured to display various icons, text, and/or graphical elements associated with approach data, descent data, variable adaptive glideslope data, or the like. In an exemplary embodiment, the display device 214 is communicatively coupled to the user interface 206 and the at least one processor 202. The at least one processor 202, the user interface 206, and the display device 214 are cooperatively configured to display, render, or otherwise convey one or more graphical representations or images associated with approach data, descent data, and variable adaptive glideslope data (e.g., glideslope data and glideslope boundaries) on the display device 214, as described in greater detail below. In an exemplary embodiment, the display device 214 is realized as an electronic display configured to graphically approach data, descent data, and variable adaptive glideslope data, as described herein. In some embodiments, the computing device 200 is an integrated computer system onboard an aircraft, and the display device 214 is located within a cockpit of the aircraft, and is thus implemented as an aircraft display. In other embodiments, the display device 214 is implemented as a display screen of a standalone, personal computing device (e.g., laptop computer, tablet computer). It will be appreciated that although the display device 214 may be implemented using a single display, certain embodiments may use additional displays (i.e., a plurality of displays) to accomplish the functionality of the display device 214 described herein. In exemplary embodiments, the display device 214 is implemented using a Vertical Situation Display (VSD) onboard the aircraft. In some embodiments, the display device 214 is implemented as a Primary Flight Display (PFD) onboard the aircraft. In other embodiments, the display device 214 is any computer monitor, computer screen (including touchscreens), audio/video presentation screen, video display unit (VDU), television, and/or any other presentation device communicatively coupled to (or integrated into) the computing device 200.

Figure 3:
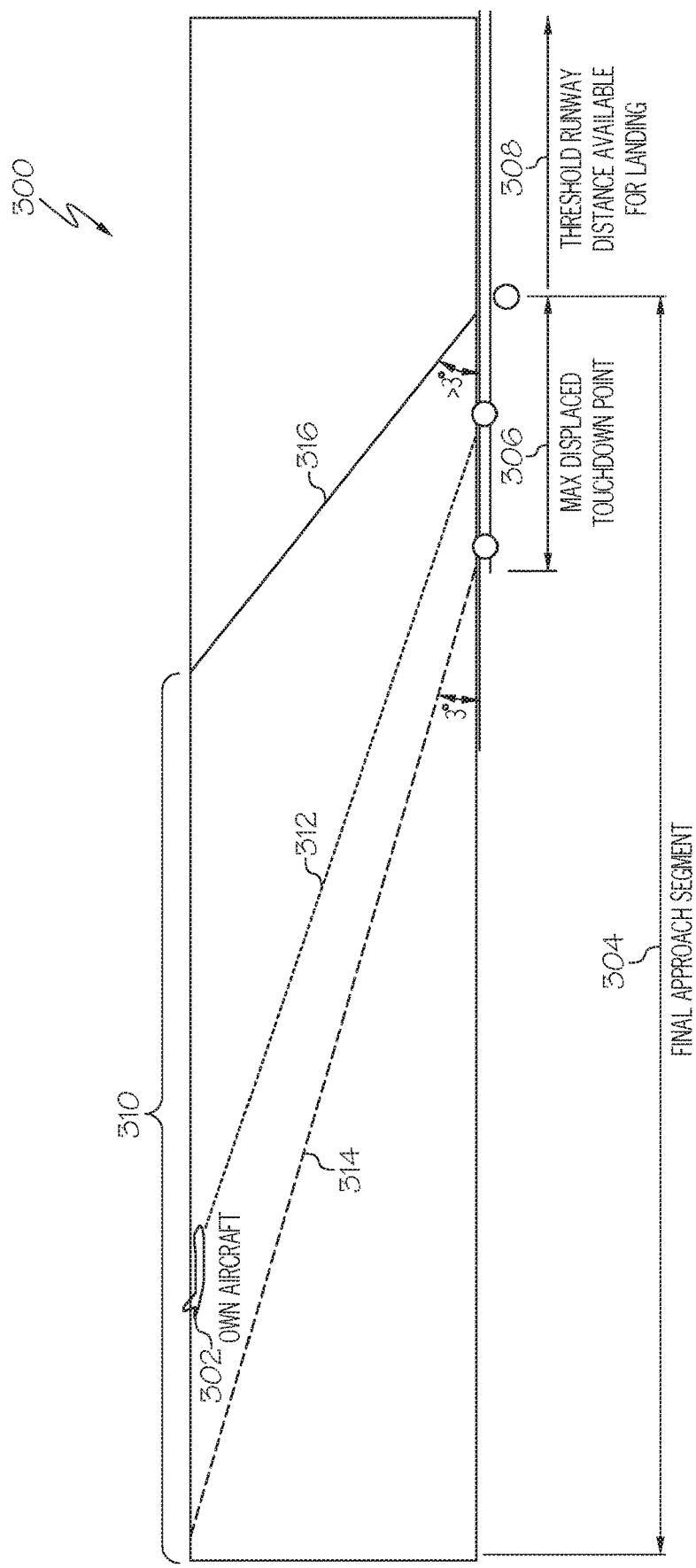
FIG. 3 is a diagram of a Vertical Situation Display (VSD) indicating a steep descent path with a displaced touchdown point, in accordance with the disclosed embodiments.

FIG. 3 is a diagram of a Vertical Situation Display (VSD) 300 indicating a steep descent path with a displaced touchdown point, in accordance with the disclosed embodiments. As described previously with regard to FIGS. 1-2, the system calculates and then presents graphical elements associated with approach and descent using an adaptive, variable glideslope, via the VSD 300.

As shown, the VSD 300 presents a position of the "ownship" aircraft 302, the final approach segment 304, a maximum displaced touchdown point 306, and a threshold runway distance available for landing 308. The final approach segment 304 is the last segment of a flight plan when the aircraft 302 is traveling into the airport, wherein the final approach segment 304 begins at the final approach fix (FAF). The remaining runway length following the maximum displaced touchdown point 306 is sufficient for performing safe stopping of the aircraft 302 based on the aircraft weight and environmental factors, including wind data, temperature data, humidity data, snow data, and the like. The threshold runway distance available for landing 308 is the remaining runway length following the maximum displaced touchdown point 306.

The VSD 300 also presents a safe descent area 310 for the aircraft 302. The safe descent area 310 for the aircraft is determined based on aircraft ground speed, vertical speed, category of aircraft, and altitude. The safe descent area 310 permits use of an adaptive, increased glideslope by the aircraft 302. The safe descent area 310 is bounded by an approach profile based on a standard glideslope 314 and a maximum descent angle 316 (i.e., the outer boundary). The safe descent area 310 includes an extrapolated ownship aircraft descent profile 312.

The extrapolated ownship aircraft descent profile 312 may also be referred to as the predictive descent path trajectory of the aircraft 302. As described previously with regard to FIG. 2, the extrapolated ownship aircraft descent profile 312 is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The optimum glideslope angle is computed as a function of aircraft landing weight, wind data, temperature data, and runway pressure altitude. The optimum glideslope angle is a "steep" descent path, or in other words, the optimum glideslope angle is a calculated glideslope that is greater than the constant value of three degrees (3°) typically used during descent and landing. The optimum glideslope angle is associated with decreased emissions, decreased fuel burn, and a displaced touchdown point.

Graphical elements representing the safe descent area 310, the maximum descent angle 316, the typical (minimum 3°) glideslope 314, and the extrapolated ownship aircraft descent profile 314, are presented by the VSD using distinguishing visual characteristics, thereby increasing flight crew situational awareness during approach and landing.

Exemplary embodiments of the variable glideslope system (see FIG. 1, reference 100) compute the outer boundary (i.e., maximum descent angle 316) and the inner boundary (i.e., approach profile based on standard glideslope 314) of the safe descent area 310 as follows: the approach profile based on standard glideslope 314 angle is computed using standard atmosphere temperature at sea level, which is equal to 288.15 (in degrees kelvin). A lapse rate of the temperature is computed for an altitude where the lapse rate is equal to approximately (1.98/1000) degrees Celsius per foot. A standard temperature at the destination is computed as (288.15−Lapse rate of the temperature)*Destination Elevation, wherein the destination elevation is a stored value in the navigation database for extraction upon selection of the flight plan. The outer boundary of the glide path is computed considering the maximum allowable descent path angle 316 for the given airframe as follows:

Delta FPA1=function (maximum allowable descent path angle, maximum vertical speed at terminal area, maximum allowable speed in terminal area operations).

Delta FPA1 function requires the maximum allowable descent path angle 316 for any given airframe, which comes as part of the performance database derived out of the flight tests results. Maximum vertical speed at the terminal area is fixed vertical speed used for the operations for the given airframe. Generally, the maximum vertical speed is in the order of −2000 feet per minute (ft/min), which is defined based on the aircraft performance derived from flight testing. The maximum allowable speed is the ground speed used for the terminal descent guidance to ensure stabilized landings.

The upper limit of the slope is computed as follows:

Upper Limit=nominal glide path angle+Delta FPA1, where the nominal glide path angle is the approach profile based on standard glideslope 314.

Delta FPA2=function (airframe, minimum vertical speed at terminal area, minimum allowable speed).

The Delta FPA2 function requires the minimum allowable descent path angle for any given airframe, which is obtained from the performance database derived out of the flight tests results. The minimum vertical speed at the terminal area is fixed vertical speed used for the operations for the given airframe. Generally, the minimum vertical speed will be in the order of −800 feet per minute (ft/min) to −500 ft/min, which is defined based on the aircraft performances derived out of flight tests. The minimum allowable speed is the ground speed used for the terminal descent guidance to ensure stabilized landings. The minimum allowable speed is either a green dot speed computed by a performance computer or the stall speed defined in the performance database.

Lower limit=nominal glide path angle−Delta FPA2, wherein the nominal glide path angle is the approach profile based on standard glideslope 314.

The variable glideslope system determines whether the differential glide path results in aircraft touchdown beyond the maximum displaced distance. If so, then the system provides an alert in the cockpit for attempting to land the aircraft 302 beyond the maximum displaced touchdown point 306.

The differential glide path may also be referred to as the extrapolated ownship aircraft descent profile, and is calculated based on the input optimum glideslope value. The differential glide path is a computed value obtained from the FMS, based on aircraft performance, aircraft state that includes outside air temperature and pressure, wind data, etc. The system determines that the differential glide path results in aircraft touchdown beyond the maximum displaced distance by comparing the geometries of intercepted point. A scenario wherein the touchdown point of differential glide slope is greater than the intercepted point of maximum glide path provides that information.

The predictive descent path trajectory is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The optimum glideslope computation is a function of FMS. The system determines whether the computed glideslope value exists within minimum and maximum glideslope values, and whether the computed touchdown point is beyond the maximum displaced point or the optimum glideslope value is not intercepting the boundary of the maximum slope.

Figure 4:
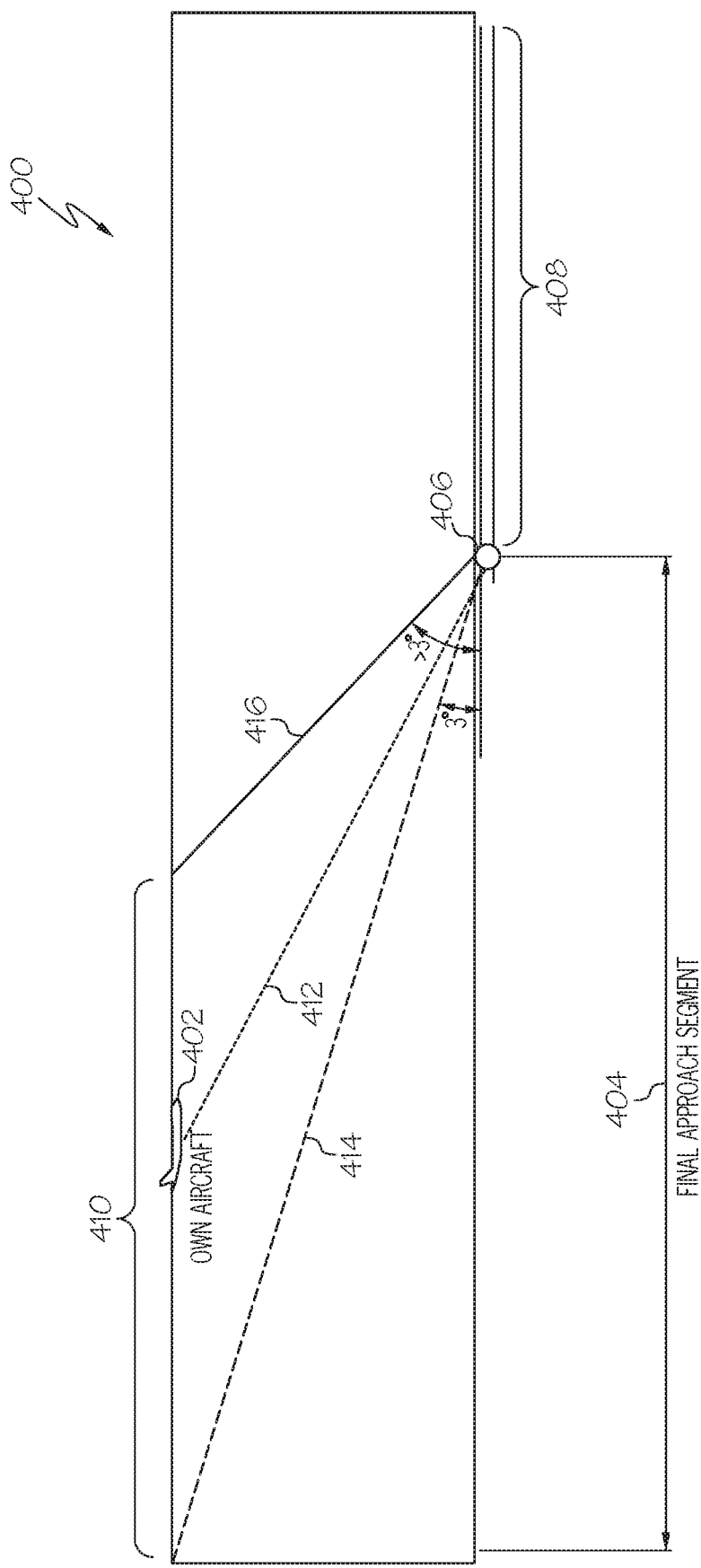
FIG. 4 is a diagram of a Vertical Situation Display (VSD) indicating a steep descent path without a displaced touchdown point, in accordance with the disclosed embodiments.

FIG. 4 is a diagram of a Vertical Situation Display (VSD) 400 indicating a steep descent path without a displaced touchdown point, in accordance with the disclosed embodiments. As described previously with regard to FIGS. 1-2, the system calculates and then presents graphical elements associated with approach and descent using an adaptive, variable glideslope, via the VSD 400.

As shown, the VSD 400 presents a position of the "ownship" aircraft 402, the final approach segment 404, a touchdown point 406, and a threshold runway distance available for landing 408. The final approach segment 404 is the last segment of a flight plan when the aircraft 402 is traveling into the airport, wherein the final approach segment 404 begins at the final approach fix (FAF). The remaining runway length following the maximum displaced touchdown point 406 is sufficient for performing safe stopping of the aircraft 402 based on the aircraft weight and environmental factors, including wind data, temperature data, humidity data, snow data, and the like. The threshold runway distance available for landing 308 is the remaining runway length following the maximum displaced touchdown point 406.

The VSD 400 also presents a safe descent area 410 for the aircraft 402. The safe descent area 410 for the aircraft is determined based on aircraft ground speed, vertical speed, category of aircraft, and altitude. The safe descent area 410 permits use of an adaptive, increased glideslope by the aircraft 402. The safe descent area 410 is bounded by an approach profile based on a standard glideslope 414 and a maximum descent angle 416 (i.e., the outer boundary). The safe descent area 410 includes an extrapolated ownship aircraft descent profile 412.

The extrapolated ownship aircraft descent profile 412 may also be referred to as the predictive descent path trajectory of the aircraft 402. As described previously with regard to FIG. 2, the extrapolated ownship aircraft descent profile 412 is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) unlinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The optimum glideslope angle is computed as a function of aircraft landing weight, wind data, temperature data, and runway pressure altitude. The optimum glideslope angle is a "steep" descent path, or in other words, the optimum glideslope angle is a calculated glideslope that is greater than the constant value of three degrees (3°) typically used during descent and landing. The optimum glideslope angle is associated with decreased emissions, decreased fuel burn, and a displaced touchdown point.

As illustrated in FIG. 4, in this particular embodiment, the variable glideslope point is programmed and the touchdown point 406 is not displaced. Thus, the area of safe glide path operation (i.e., the safe descent area 410) is presented as shown. Displaced threshold information comes from a navigation database (NDB), and the displaced threshold can be programmed by making entries on the CDU page (pilot entries) or AOC uplink.

Figure 5:
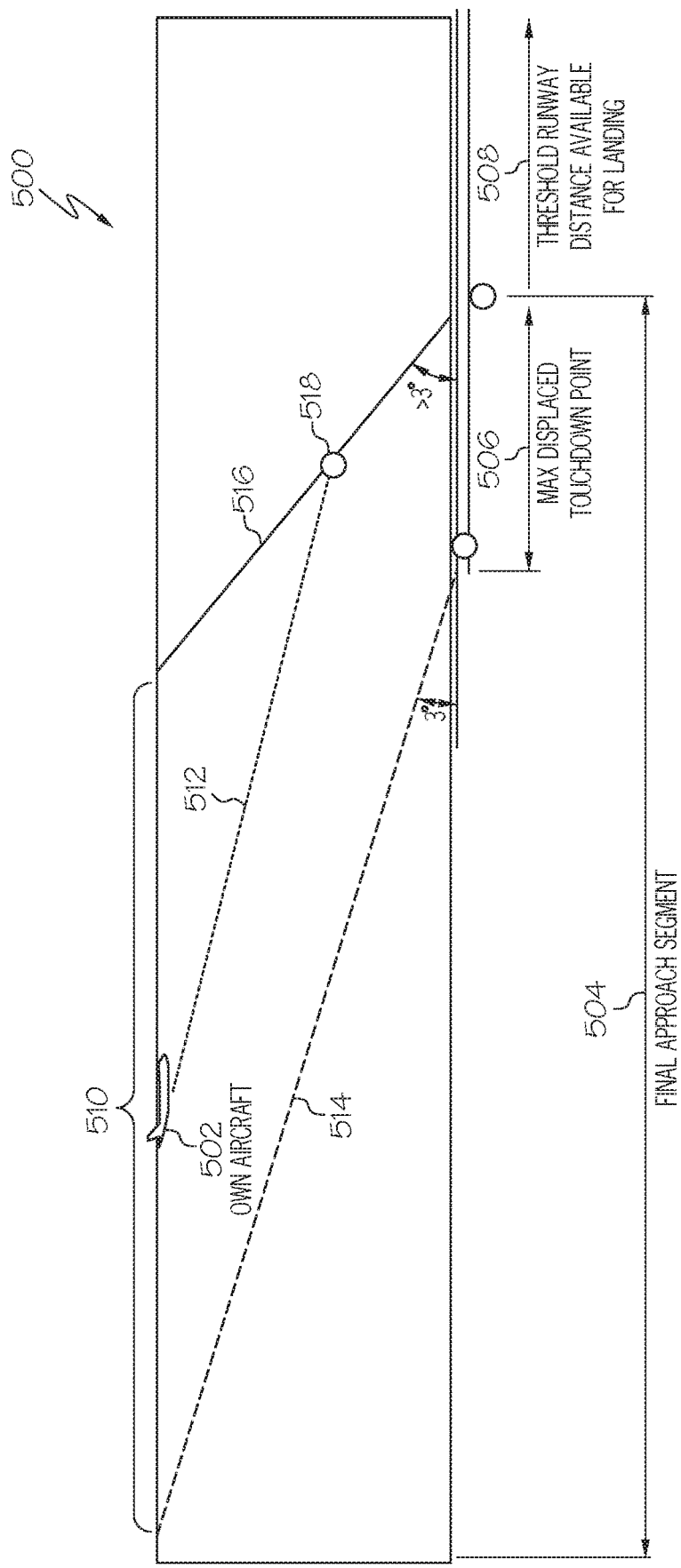
FIG. 5 is a diagram of a Vertical Situation Display (VSD) indicating a predictive interception of an aircraft vertical path with an adaptive increased glideslope, in accordance with the disclosed embodiments.

FIG. 5 is a diagram of a Vertical Situation Display (VSD) 500 indicating a predictive interception of an aircraft vertical path with an adaptive increased glideslope, in accordance with the disclosed embodiments. As described previously with regard to FIGS. 1-2, the system calculates and then presents graphical elements associated with approach and descent using an adaptive, variable glideslope, via the VSD 500.

As shown, the VSD 500 presents a position of the "ownship" aircraft 502, the final approach segment 504, a maximum displaced touchdown point 506, and a threshold runway distance available for landing 508. The final approach segment 504 is the last segment of a flight plan when the aircraft 502 is traveling into the airport, wherein the final approach segment 504 begins at the final approach fix (FAF). The remaining runway length following the maximum displaced touchdown point 506 is sufficient for performing safe stopping of the aircraft 502 based on the aircraft weight and environmental factors, including wind data, temperature data, humidity data, snow data, and the like. The threshold runway distance available for landing 508 is the remaining runway length following the maximum displaced touchdown point 506.

The VSD 500 also presents a safe descent area 510 for the aircraft 502. The safe descent area 510 for the aircraft is determined based on aircraft ground speed, vertical speed, category of aircraft, and altitude. The safe descent area 510 permits use of an adaptive, increased glideslope by the aircraft 502. The safe descent area 510 is bounded by an approach profile based on a standard glideslope 514 and a maximum descent angle 516 (i.e., the outer boundary). The safe descent area 510 includes an extrapolated ownship aircraft descent profile 512.

The extrapolated ownship aircraft descent profile 512 may also be referred to as the predictive descent path trajectory of the aircraft 502. As described previously with regard to FIG. 2, the extrapolated ownship aircraft descent profile 512 is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The optimum glideslope angle is computed as a function of aircraft landing weight, wind data, temperature data, and runway pressure altitude. The optimum glideslope angle is a "steep" descent path, or in other words, the optimum glideslope angle is a calculated glideslope that is greater than the constant value of three degrees (3°) typically used during descent and landing. The optimum glideslope angle is associated with decreased emissions, decreased fuel burn, and a displaced touchdown point.

In the embodiment illustrated by FIG. 5, the variable glideslope system determines whether the predictive aircraft descent path 512 results in the touchdown point 518 beyond maximum displaced touchdown point 506. If the shallowness of the descent path 512 results in intercepting the backward interception of the adaptive increased glide path, then the variable glideslope system warns the flight crew on the possibility of runway overrun. Here, the variable glideslope system provides graphical elements representing a current approach and descent data, thereby providing flight crew members an opportunity to correct the glide path to move aircraft 502 within the safe descent area 510, or to provide the flight crew an opportunity to declare a missed approach go-around due to the unstable approach conditions.

Figure 6:
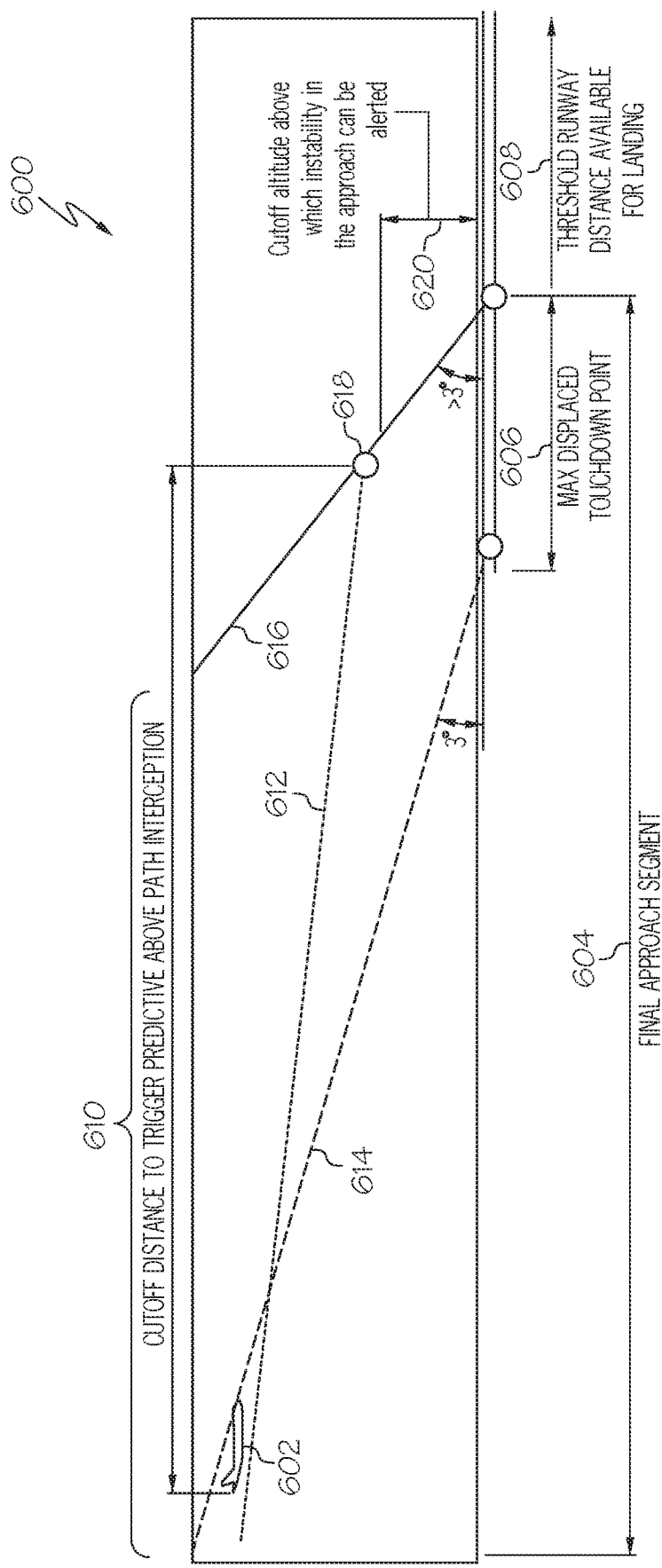
FIG. 6 is another diagram of a Vertical Situation Display (VSD) indicating a predictive interception of an aircraft vertical path with an adaptive increased glideslope for a maximum displaced threshold, in accordance with the disclosed embodiments.

FIG. 6 is another diagram of a Vertical Situation Display (VSD) 600 indicating a predictive interception of an aircraft vertical path with an adaptive increased glideslope, in accordance with the disclosed embodiments. As described previously with regard to FIGS. 1-2, the system calculates and then presents graphical elements associated with approach and descent using an adaptive, variable glideslope, via the VSD 600.

As shown, the VSD 600 presents a position of the "ownship" aircraft 602, the final approach segment 604, a maximum displaced touchdown point 606, and a threshold runway distance available for landing 608. The final approach segment 604 is the last segment of a flight plan when the aircraft 302 is traveling into the airport, wherein the final approach segment 604 begins at the final approach fix (FAF). The remaining runway length following the maximum displaced touchdown point 606 is sufficient for performing safe stopping of the aircraft 602 based on the aircraft weight and environmental factors, including wind data, temperature data, humidity data, snow data, and the like. The threshold runway distance available for landing 608 is the remaining runway length following the maximum displaced touchdown point 606.

The VSD 600 also presents a safe descent area 610 for the aircraft 602. The safe descent area 610 for the aircraft is determined based on aircraft ground speed, vertical speed, category of aircraft, and altitude. The safe descent area 610 permits use of an adaptive, increased glideslope by the aircraft 602. The safe descent area 610 is bounded by an approach profile based on a standard glideslope 614 and a maximum descent angle 616 (i.e., the outer boundary). The safe descent area 610 includes an extrapolated ownship aircraft descent profile 612.

The extrapolated ownship aircraft descent profile 612 may also be referred to as the predictive descent path trajectory of the aircraft 602. As described previously with regard to FIG. 2, the extrapolated ownship aircraft descent profile 612 is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The optimum glideslope angle is computed as a function of aircraft landing weight, wind data, temperature data, and runway pressure altitude. The optimum glideslope angle is a "steep" descent path, or in other words, the optimum glideslope angle is a calculated glideslope that is greater than the constant value of three degrees (3°) typically used during descent and landing. The optimum glideslope angle is associated with decreased emissions, decreased fuel burn, and a displaced touchdown point.

As illustrated in FIG. 6, in order to avoid spurious alerts or to avoid alerting the pilot on the aircraft 602 touchdown point 618 calculated to be beyond the maximum displaced touchdown point 606, the variable glideslope system produces alerts only when the aircraft 602 is within a cutoff threshold distance and the predicted profile 612 is intercepting the glide path (i.e., the maximum descent angle 616). The variable glideslope system also considers whether the predicted intercept point 618 is not below the minimum cut-off altitude 620. The maximum distance threshold 606 and cut-off altitude threshold 620 used for alerting is a customizable parameter for the operator, and typically is on the order of two (2) nautical miles and 500 feet, respectively.

Figure 7:
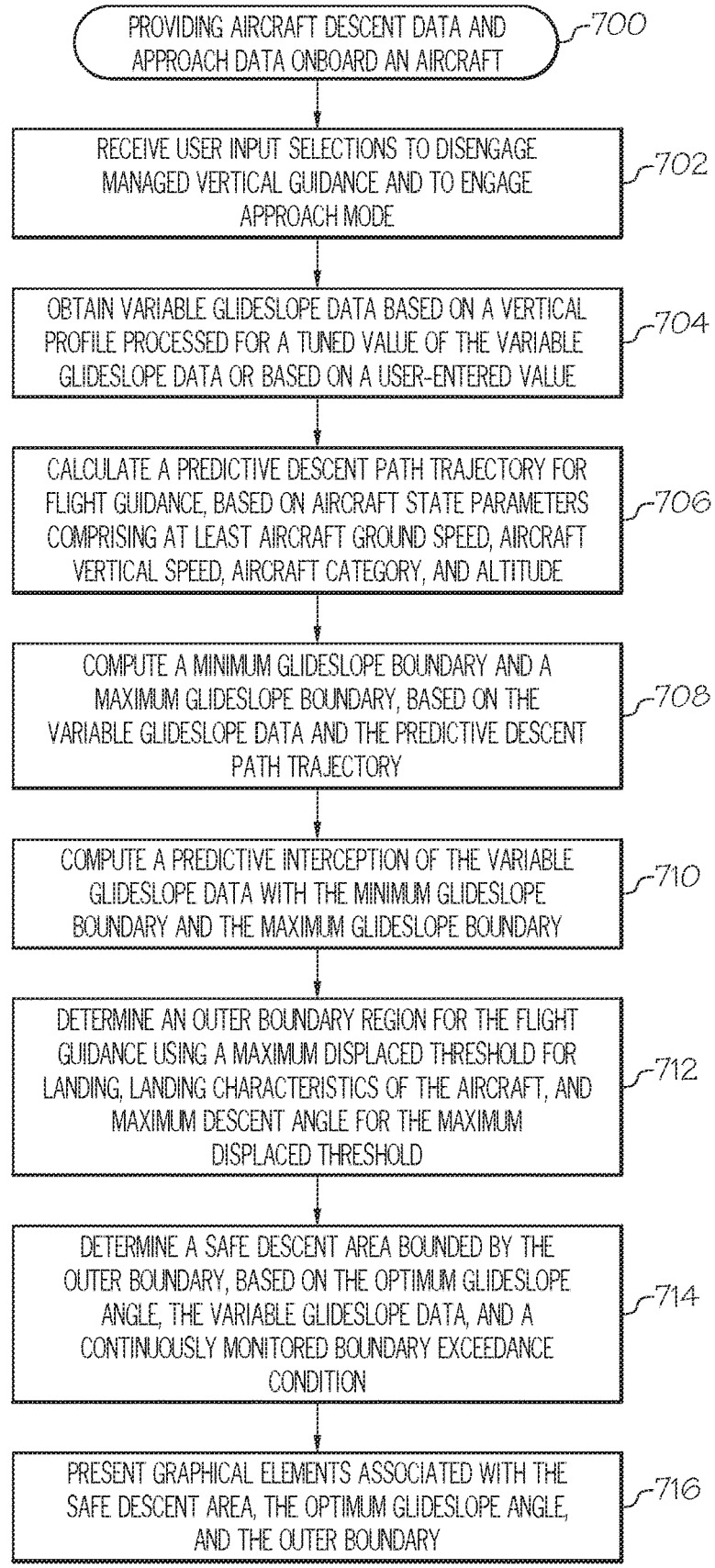
FIG. 7 is a flow chart that illustrates an embodiment of a process for providing aircraft descent and approach data onboard an aircraft, in accordance with the disclosed embodiments.

FIG. 7 is a flow chart that illustrates an embodiment of a process 700 for providing aircraft descent and approach data onboard an aircraft, in accordance with the disclosed embodiments. The various tasks performed in connection with process 700 may be performed by software, hardware, firmware, or any combination thereof. For illustrative purposes, the following description of process 700 may refer to elements mentioned above in connection with FIGS. 1-6. In practice, portions of process 700 may be performed by different elements of the described system. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

First, the process 700 receives user input selections to disengage managed vertical guidance and to engage approach mode (step 702). The user input selections are generally received via an aircraft onboard Flight Management System (FMS). The result of the overall process 700 is the display the safe area of operations for the tuned/variable glideslope that is desynchronized from the planned flight profile. Using conventional Surface Landing System (SLS) functions, the glideslope from the Final Approach Segment (FAS) data block and the slope from Final Approach Fix (FAF) to Missed Approach Procedures (MAP) is a constant three-degree (3°) glideslope. However, the process 700 implements adaptive increased glideslope operations, including a desynchronized vertical slope which differs significantly from that of the vertical slope coded in the navigation database and which is part of the flight plan.

Next, the process 700 obtains variable glideslope data based on a vertical profile processed for a tuned value of the variable glideslope data or based on a user-entered value (step 704). The flight crew is required to disengage from the managed vertical guidance and to engage or arm Approach Mode (APPR) on the mode control panel in order to capture the variable glideslope. Now with the application of the programmable glideslope, there is a need for the representation of safe area of operations. Here, the tuned value of the variable glideslope data is an optimum glideslope value that is either entered by pilot, obtained via AOC uplink, computed by the FMS onboard the aircraft, or is computed by other applications in the cockpit (e.g., electronic flight bag (EFB)).

The process 700 then calculates a predictive descent path trajectory for flight guidance, based on aircraft state parameters comprising at least aircraft ground speed, aircraft vertical speed, aircraft category, and altitude (step 706), and the process 700 computes a minimum glideslope boundary and a maximum glideslope boundary, based on the variable glideslope data and the predictive descent path trajectory (step 708).

The predictive descent path trajectory is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The process 700 also computes a predictive interception of the variable glideslope data with the minimum glideslope boundary and the maximum glideslope boundary (step 710). The predictive descent path trajectory of the aircraft is computed based on aircraft ground speed, vertical speed, category of aircraft, and altitude. The predictive interception of the variable glideslope data with the minimum glideslope boundary is a location point of the minimum glideslope boundary (i.e., the approach profile for the aircraft based on a standard, three-degree (3°) glideslope) at which the aircraft may intercept the minimum glideslope boundary when using the predictive descent path trajectory. The predictive interception of the variable glideslope data with the maximum glideslope boundary is a location point of the maximum glideslope boundary (i.e., the maximum descent angle, the outer boundary) at which the aircraft may intercept the maximum glideslope boundary when using the predictive descent path trajectory. The predictive interception of the variable glideslope data, and the minimum and maximum glideslope boundaries are geometrics in space. Computation of angular interception from the aircraft extrapolated descent path with the minimum and maximum slopes are defined by the predictive descent path trajectory.

The process 700 determines an outer boundary region for the flight guidance using a maximum displaced threshold for landing, landing characteristics for the aircraft, and a maximum descent angle for the maximum displaced threshold (step 712). Landing characteristics include aircraft parameter data (e.g., aircraft speed, altitude, vertical speed) and environmental data associated with the runway (e.g., wind data, temperature data, precipitation data). The maximum displaced landing threshold is such that the remaining runway length following the threshold point is sufficient for performing safe stopping of the aircraft based on the aircraft weight and environmental factors, including wind data, temperature data, humidity data, snow data, and the like.

The process 700 determines a safe descent area bounded by the outer boundary, based on the optimum glideslope angle, the variable glideslope data, and a continuously monitored boundary exceedance condition (step 714). An outer boundary region is a maximum glideslope boundary for the safe region for aircraft descent. The safe region for aircraft descent permits use of an adaptive, increased glideslope. The safe region is bounded by an approach profile based on a standard glideslope and a maximum descent angle (i.e., the outer boundary). The predictive descent path trajectory is the vertical slope processed based on the optimal glide slope angle. The optimal glideslope angle may be: (1) user-entered, (2) obtained via the flight management system (FMS) based on the aircraft performance data and aircraft state conditions such as ground speed, vertical speed, temperature, pressure, wind, etc., (3) uplinked from a ground station (e.g., an aircraft operator (AOC), air traffic control (ATC)), and/or (4) obtained via an electronic flight bag (EFB) application connected to other cockpit systems. The safe region for aircraft descent is an area of vertical descent operations located between an area too steep for safe aircraft operations (indicated by the maximum glideslope path) and an area too shallow for safe aircraft operations (indicated by the minimum glideslope path).

The process 700 then presents graphical elements associated with the safe descent area, the optimum glideslope angle, and the outer boundary (step 716). The graphical elements are presented using distinguishing visual characteristics, such that a flight crew is presented with a visual and intuitive interface display of approach and landing data. Generally, the process 700 presents the graphical elements via a Vertical Situation Display (VSD). However, in some embodiments, the process 700 may present the graphical elements via another onboard display integrated into the aircraft (e.g., a Primary Flight Display (PFD)) or via a computing device display associated with a personal computing device configured to store, maintain, and execute an Electronic Flight Bag (EFB) application.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing aircraft descent data and approach data onboard an aircraft, the method comprising:
   determining a safe descent area bounded by an outer boundary region, by a processor communicatively coupled to a system memory element, based on an optimum glideslope angle, adaptive increased glideslope data, and a continuously monitored boundary exceedance condition;
   determining, by the processor, a predictive aircraft descent path trajectory, wherein the predictive aircraft descent path is based on a vertical slope processed based on the optimal glideslope angle, and wherein the continuously monitored boundary exceedance condition is determined based on whether the predictive aircraft descent path trajectory intercepts the outer boundary region;
   obtaining, by the processor, a maximum displaced threshold indicating a landing point with a minimum remaining runway length to perform safe stopping of the aircraft based on aircraft weight and environmental factors;
   determining the outer boundary region for flight guidance using the maximum displaced threshold for landing, landing characteristics of the aircraft, and a maximum descent angle for the maximum displaced threshold;
   obtaining the adaptive increased glideslope data, by the processor, based on a vertical profile processed for a value of the adaptive increased glideslope data;
   calculating the predictive aircraft descent path trajectory for flight guidance, by the processor, based on aircraft state parameters comprising at least aircraft ground speed, aircraft vertical speed, aircraft category, and altitude;
   computing a minimum glideslope boundary and a maximum glideslope boundary, by the processor, based on the adaptive increased glideslope data and the predictive aircraft descent path trajectory; and
   presenting graphical elements associated with the safe descent area, the optimum glideslope angle, and the outer boundary region, by a display device communicatively coupled to the processor during an approach procedure performed with the aircraft to provide flight crew members an opportunity to correct a glide path to move the aircraft within the safe descent area or to provide the flight crew members an opportunity to declare a missed approach go-around due to unstable approach conditions,
   wherein the safe descent area comprises the minimum glideslope boundary and the maximum glideslope boundary.

2. The method of claim 1, further comprising:
   obtaining user input selection data from a flight management system (FMS) onboard the aircraft, by the processor via a communication device configured to establish communication connections between the processor and the FMS, wherein the user input selection data includes an instruction to disengage managed vertical guidance and to engage approach mode; and
   computing the safe descent area and the outer boundary region, by the processor, based on the approach mode.

3. The method of claim 1, further comprising:
   computing a predictive interception of the adaptive increased glideslope data with the minimum glideslope boundary and the maximum glideslope boundary, by the processor;
   wherein the outer boundary region is based on the predictive interception of the adaptive increased glideslope data with the minimum glideslope boundary and the maximum glideslope boundary.

4. The method of claim 1, wherein:
   the value of the adaptive increased glideslope data is a tuned value.

5. The method of claim 1, wherein:
the value of the adaptive increased glideslope data is a pilot-entered value; and
the predictive aircraft descent path trajectory for flight guidance is obtained via a flight management system (FMS) and by the processor.

6. A system for providing aircraft descent data and approach data onboard an aircraft, the system comprising:
a system memory element;
a communication device configured to establish communication connections to a flight management system (FMS) and avionics systems onboard the aircraft;
a display device, configured to present descent path data onboard the aircraft; and
at least one processor communicatively coupled to the system memory element, the communication device, and the display device, the at least one processor configured to:
determine a safe descent area bounded by an outer boundary region, based on an optimum glideslope angle, adaptive increased glideslope data, and a continuously monitored boundary exceedance condition;
determine a predictive aircraft descent path trajectory based on a vertical slope processed based on the optimal glideslope angle, wherein the continuously monitored boundary exceedance condition is determined based on whether the predictive aircraft descent trajectory path intercepts the outer boundary region;
obtain a maximum displaced threshold indicating a landing point with a minimum remaining runway length to perform safe stopping of the aircraft based on aircraft weight and environmental factors;
determine the outer boundary region for flight guidance using the maximum displaced threshold for landing, landing characteristics of the aircraft, and a maximum descent angle for the maximum displaced threshold;
obtain the adaptive increased glideslope data, by the processor, based on a vertical profile processed for a value of the adaptive increased glideslope data;
calculate the predictive aircraft descent path trajectory for flight guidance, by the processor, based on aircraft state parameters comprising at least aircraft ground speed, aircraft vertical speed, aircraft category, and altitude;
compute a minimum glideslope boundary and a maximum glideslope boundary, by the processor, based on the adaptive increased glideslope data and the predictive aircraft descent path trajectory; and
present graphical elements associated with the safe descent area, the optimum glideslope angle, and the outer boundary region, via the display device during an approach procedure performed with the aircraft to provide flight crew members an opportunity to correct a glide path to move the aircraft within the safe descent area or to provide the flight crew members an opportunity to declare a missed approach go-around due to unstable approach conditions.

7. The system of claim 6, wherein the at least one processor is further configured to:
obtain user input selection data from the FMS, via the communication device, wherein the user input selection data includes an instruction to disengage managed vertical guidance and to engage approach mode; and
compute the safe descent area and the outer boundary region, based on the approach mode.

8. The system of claim 6, wherein the at least one processor is further configured to:
compute a predictive interception of the adaptive increased glideslope data with the minimum glideslope boundary and the maximum glideslope boundary;
wherein the outer boundary region is based on the predictive interception of the adaptive increased glideslope data with the minimum glideslope boundary and the maximum glideslope boundary.

9. The system of claim 6, wherein:
the value of the adaptive increased glideslope data is a tuned value.

10. The system of claim 6, wherein:
the value of the adaptive increased glideslope data is a pilot-entered value; and
the predictive aircraft descent path trajectory for flight guidance is obtained via the FMS and by the processor.

11. A non-transitory, computer-readable medium containing instructions thereon, which, when executed by a processor, perform a method for providing aircraft descent data and approach data onboard an aircraft, the method comprising:
obtaining user input selection data from a flight management system (FMS) onboard the aircraft, by the processor via a communication device configured to establish communication connections between the processor and the FMS, wherein the user input selection data includes an instruction to disengage managed vertical guidance and to engage approach mode;
initiating computation of a safe descent area, when the approach mode is engaged;
determining the safe descent area bounded by an outer boundary region, by the processor, based on an optimum glideslope angle, adaptive increased glideslope data, and a continuously monitored boundary exceedance condition;
determining a predictive aircraft descent path trajectory, wherein the predictive aircraft descent path trajectory is based on a vertical slope processed based on the optimal glideslope angle, and wherein the continuously monitored boundary exceedance condition is determined based on whether the predictive aircraft descent path trajectory intercepts the outer boundary region;
obtaining, by the processor, a maximum displaced threshold indicating a landing point with a minimum remaining runway length to perform safe stopping of the aircraft based on aircraft weight and environmental factors;
determining the outer boundary region for flight guidance using the maximum displaced threshold for landing, landing characteristics of the aircraft, and a maximum descent angle for the maximum displaced threshold;
obtaining the adaptive increased glideslope data, by the processor, based on a vertical profile processed for a value of the adaptive increased glideslope data;
calculating the predictive aircraft descent path trajectory for flight guidance, by the processor, based on aircraft state parameters comprising at least aircraft ground speed, aircraft vertical speed, aircraft category, and altitude;
computing a minimum glideslope boundary and a maximum glideslope boundary, by the processor, based on the adaptive increased glideslope data and the predictive aircraft descent path trajectory; and presenting graphical elements associated with the safe descent area, the optimum glideslope angle, and the outer boundary region, by a display device communicatively coupled to the processor during an approach procedure performed with the aircraft to provide flight crew members an opportunity to correct a glide path to move the aircraft within the safe descent area or to provide the flight crew members an opportunity to declare a missed approach go-around due to unstable approach conditions.

12. The non-transitory, computer-readable medium of claim 11, wherein the method further comprises:
computing a predictive interception of the adaptive increased glideslope data with the minimum glideslope boundary and the maximum glideslope boundary, by the processor;
wherein the outer boundary region is based on the predictive interception of the adaptive increased glideslope data with the minimum glideslope boundary and the maximum glideslope boundary.

13. The non-transitory, computer-readable medium of claim 11, wherein:
the value of the adaptive increased glideslope data is a tuned value.

14. The non-transitory, computer-readable medium of claim 11, wherein:
the value of the adaptive increased glideslope data is a pilot-entered value; and
the predictive aircraft descent path trajectory for flight guidance is obtained via the FMS and by the processor.

* * * * *